Oct. 11, 1955  J. W. HUTCHINS  2,720,594
MULTI-COMPONENT INFRARED ANALYZER
Filed Jan. 2, 1951  3 Sheets-Sheet 2

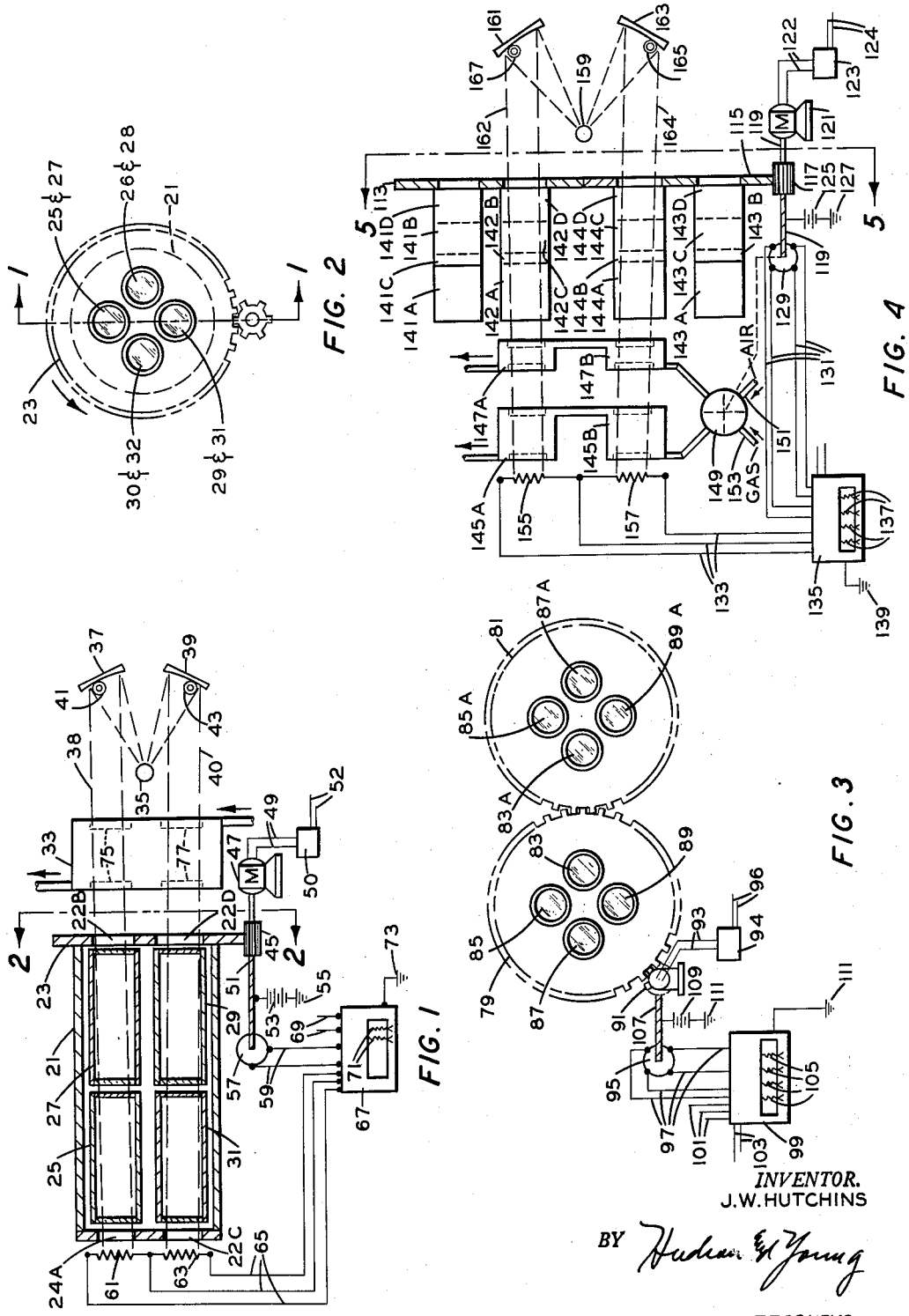

INVENTOR.
J.W. HUTCHINS

BY

ATTORNEYS

Oct. 11, 1955     J. W. HUTCHINS     2,720,594
MULTI-COMPONENT INFRARED ANALYZER

Filed Jan. 2, 1951     3 Sheets-Sheet 3

INVENTOR.
J. W. HUTCHINS

ATTORNEYS

United States Patent Office 2,720,594
Patented Oct. 11, 1955

2,720,594
MULTI-COMPONENT INFRARED ANALYZER

Joseph W. Hutchins, Bartlesville, Okla., assignor to Phillips Petroleum Company, a corporation of Delaware Application January 2, 1951, Serial No. 203,900

9 Claims. (Cl. 250—43.5)

This invention relates to a radiation analyzer. In one aspect, it relates to an infrared analyzer in which a plurality of different streams are successively analyzed. In another aspect, it relates to such an analyzer in which one stream is analyzed to determine the proportion of a plurality of components.

Heretofore, there has been no convenient method of analyzing hydrocarbon streams in a quick and efficient manner when it is desired to attain rapid analyses at the site of a gas well or in a liquid processing step.

My invention provides in particular an analyzer adapted for analyzing a stream for a plurality of components, as in a refinery, in one compact and relatively simple in operation.

It is an object of my invention to provide an analyzer for determining percentages of different components in a single stream in one relatively simple apparatus.

Another object of my invention is to provide an apparatus for determining the percentages of different components in a single stream with a minimum of moving parts.

Still another object of my invention is to provide such an apparatus which can be constructed in a durable manner and yet have a high degree of reliability.

Figure 5:
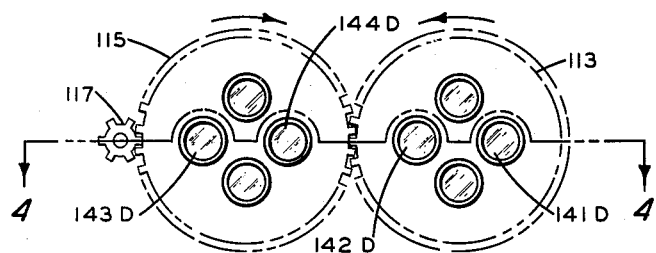
Figures 6, 7:
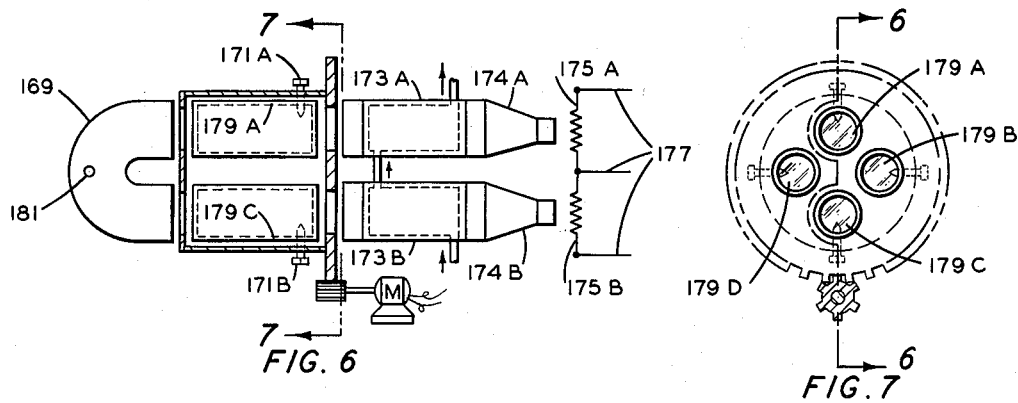
Figures 8, 9:
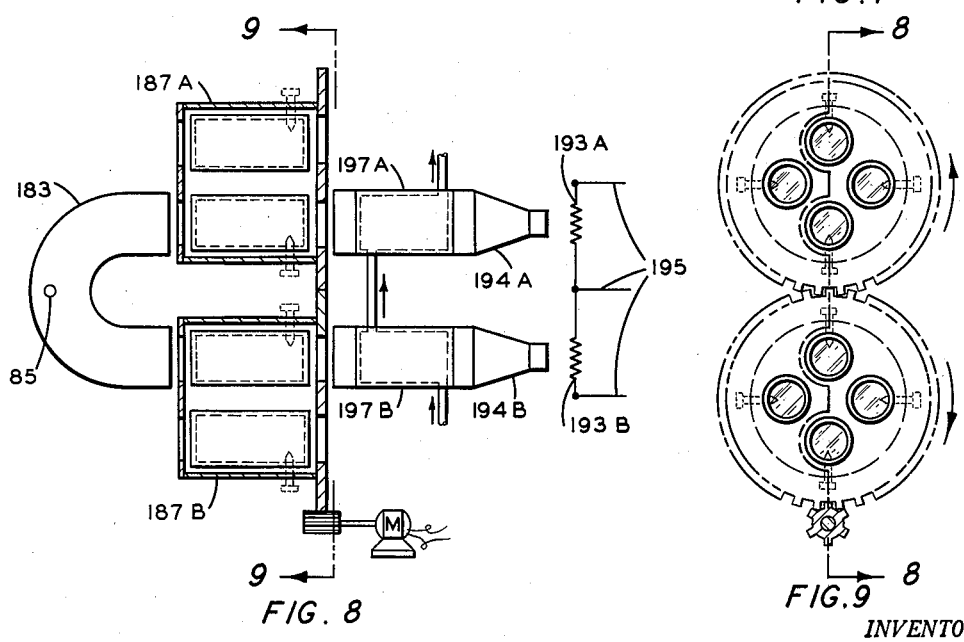
Figure 10:
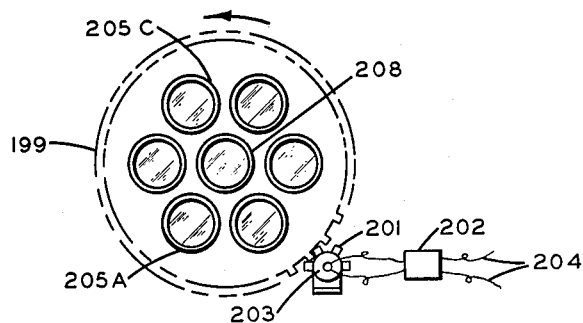
Figure 11:
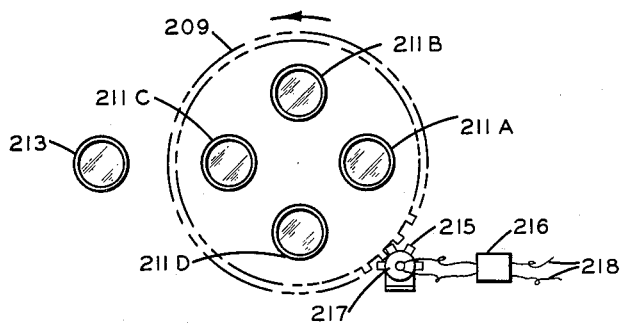
Figure 12:
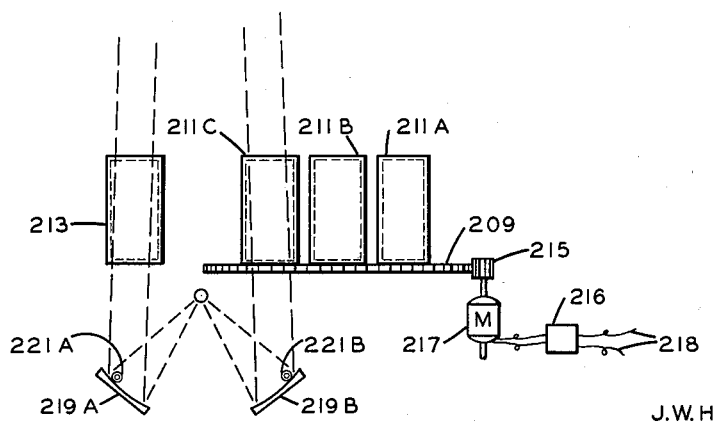

Various other objects, advantages, and features of the invention will become apparent upon reading the following detailed description taken in conjunction with the accompanying drawing, in which Figure 1 is a plan view partly in section of one embodiment of my invention. Figure 2 is an end view of a portion of the apparatus of Figure 1 as taken on the line 2—2 of Figure 1. Figure 3 is an end view of another embodiment of my invention. Figure 4 is a plan view partly in section of another embodiment of my invention. Figure 5 is an end view of a portion of the apparatus of Figure 4 taken on the line 5—5. Figure 6 is a plan view partly in section of still another embodiment of my invention. Figure 7 is an end view of a portion of the apparatus of Figure 6 and taken on the line 7—7 thereof. Figure 8 is a plan view partly in section of still another embodiment of my invention and taken on the line 8—8 of Figure 9. Figure 9 is an elevational view of a portion of the apparatus of Figure 8 as taken on the line 9—9 thereof. Figures 10 and 11 are end views of portions of additional embodiments of apparatus. Figure 12 is a plan view of a portion of the apparatus 11.

Referring now to the drawing and particularly Figures 1 and 2, this embodiment of apparatus consists of a cylinder or barrel 21 having openings at both ends, as openings 24A, 22B, 22C and 22D. At one end of this cylinder 21 is rigidly attached a gear 23. A small gear 45 meshes with a gear 23. Gear 45 is driven by a motor 47, which may be an electrical motor obtaining power through leads 49 and 52. Element 50 is a time clock switch apparatus adapted to open and to close the electrical circuit to motor 47.

Element 35 is a source of radiation, for example, a source of infrared radiation. Reflectors 37 and 39 are usually front surface spherical mirrors and focus portions of the radiation as beams 38 and 40, respectively, on radiation detectors 61 and 63, respectively. The beams 38 and 40 pass through the cylinder 21 as indicated and impinge against elements 61 and 63. These elements 61 and 63 are bolometers which are actually two resistance arms of a Wheatstone bridge apparatus described in an application for patent, Serial No. 103,158, filed July 5, 1949. Elements 41 and 43 are trimmers which are actually apparatus elements intended for insertion into the beam of radiation for blocking out portions thereof for the express purpose of adjusting balance of the two beams so that they may have the same intensity. These trimmers 41 and 43 may be small shutters and so placed as to cut out portions of the radiation beams for adjustment thereof. These trimmers may also be merely threaded bolts for ease of adjustment and insertion into or withdrawal from radiation beams.

Extending from the motor 47 and through the gear 45 is a shaft 51. On the extended end of this shaft 51 is a selector switch 57 which is provided with two takeoff terminals for wires 59. The battery 53 grounded at ground 55 furnishes current for passage through the shaft 51, the selector switch 57, wires 59, and the recorder 67. A second ground 73 completes this battery circuit.

Element 67 is a recording device which in this case may be a recording potentiometer for example. With elements 61 and 63 being two arms of a Wheatstone bridge, the remaining two arms of the Wheatstone bridge are contained within the apparatus 67. The three wires 65 connect the bolometers, "Thermistors," or any other type of radiation detectors, 61 and 63 as shown to the recording apparatus 67. The two wires 59 connect the two terminals of the selector switch 57 to the recording apparatus 67. Wires 69 from the recorder 67 are for supplying electrical current from a source, not shown, to the recorder.

Since the embodiments of apparatus illustrated by Figures 1 and 2 are for analysis or determination of two components of a sample, the two traces 71 are records of the analysis of such a two-component sample.

Disposed within the cylinder 21 are several cells 25, 27, 29 and 31. These cells may be of more or less conventional construction having transparent windows which permit passage of the type of radiation used in the apparatus. In Figure 2 which is an end view of this cylinder apparatus with its gear 23, are four circular openings through which the windows of the several cells may be seen. The cell windows which are adjacent the openings in Figure 2 are windows from cells 27, 28, 29, and 30. Cell windows from cells 25, 26, 31 and 32 are nearer the opposite end of the cylinder 21.

Some radiation from source 35 is reflected from reflector 37 as beam 38. This beam passes through the opening 22B in gear 23 and through cell 27 and its pair of end windows, through cell 25 and its pair of end windows and out opening 24A in the opposite end of cylinder 21 and to the bolometer 61.

In the other side of the cylinder 21 as seen in Figure 1, a portion of the radiation from source 35 which radiates in the direction of the reflector 39 is reflected therefrom as beam 40 and this beam passes through opening 22D in the wheel 23 and through cell 29 and its two end windows, through cell 31 and its two end windows and through the circular opening 22C in the direction of the bolometer apparatus 63. As shown in the plan view in Figure 1 are two sets of cells 25—27 and 31—29. However, actually in this embodiment as illustrated in Figures 1 and 2 are four sets or pairs of cells. The two pairs which are not shown in Figure 1 are cells 26—28 and 30—32, as indicated in Figure 2.

Disposed outside of the cylinder 21 and in the embodiment illustrated in Figure 1 between the gear 23 and the radiation source 35 is a sample cell 33. This sample 33 is relatively large and is intended to have windows 75 and 77 through which the two beams of radiation 38 and 40 pass.

The windows 75 and 77 of the sample cell 33 and the windows of the cells 25, 26, 27, 28, 29, 30, 31, and 32 may be made of such material as silver chloride, quartz, calcium fluoride, spinel, rock salt and lithium fluoride. Any other material may be used for construction of the windows providing such material permits passage of desired wave lengths or frequencies of radiation. The windows, of course, must have enough strength as to be self-supporting and should be capable of being tightly attached to the cell walls so that the cells may be made gas-tight or liquid-tight and withstand at least some pressure.

The apparatus illustrated in Figures 1 and 2 is adapted for the analysis of a two-component gas or liquid stream. For example, this apparatus may be used for the analysis of a two-component hydrocarbon gas stream or the analysis of a two-component liquid hydrocarbon stream. I will explain the operation of this embodiment of apparatus for the analysis of the two-component gas stream consisting of ethane and propane. Electrical current is turned on to the source of radiation 35 for the production of infrared rays. Such rays radiate, of course, in all directions and a portion which radiates in the direction of reflector 37 is reflected from this concave surface to form beam 38 which then passes through the sample cell 33 and through the several cells 27 and 25 in the cylinder 21 to contact the bolometer or arm 61 of the Wheatstone bridge apparatus. Another portion of the infrared radiation radiating from source 35 in the direction of reflector 39 is reflected from this concave reflector as beam 40 and traverses the sample cell 33, cells 29 and 31, to contact the bolometer element 63. When cell 25 is charged with ethane gas this cell will then absorb certain frequencies or wave lengths of radiation characteristic of ethane. Thus, when cell 25 is filled with ethane none of the frequencies characteristically absorbed by ethane gas will pass through cell 25 to contact the bolometer element 61. In like manner, when cell 27 is filled with propane this gas will then absorb certain characteristic frequencies or wave lengths of radiation and such radiation cannot pass through this cell. When beam 38 is directed through cells 25 and 27 which are filled respectively with ethane and propane, none of the radiation wave lengths or frequencies characteristically absorbed by ethane and propane can pass through these cells and the only radiation which can pass through this combination of cells is radiation not absorbed by these cells. Thus, as far as cells 25 and 27 are concerned any infrared radiation which passes through these cells is termed as being "blacked out" as regards ethane and propane absorption. When the arrangement of apparatus is intended to determine the percentage of propane in a sample of ethane and propane, the cell 31 is filled with ethane for its absorption of the characteristic frequencies or wave length of this radiation. The cell 29 is then filled with air. The infrared radiation, as beam 40, which passes through cell 29 and cell 31 still contains the characteristic frequencies which are absorbable by propane.

The gas to be analyzed for ethane and propane is passed into the sample cell 33. When this cell is filled with the gas to be analyzed and the radiation source 35 activated, the infrared beams are reflected from reflectors 37 and 39 as beams 38 and 40, respectively. Beam 38 passing through its side of the apparatus has all of the wave lengths or frequencies characteristically absorbed by ethane and propane removed. Thus, radiation beam 38 is "blacked out" with respect to the ethane and propane frequencies. The beam 40 when passing through its side of the apparatus is blacked out as regards the frequencies characteristically absorbed by "ethane" but contains frequencies which may be absorbed by propane.

If the gas undergoing analysis contains some propane some of the radiation will be absorbed and some of it will traverse this section of the apparatus to impinge against the bolometer 63. The amount or intensity of radiation impinging against the bolometer 63 will be dependent upon the radiation not absorbed by the propane in the sample cell 33. Thus, impinging against the bolometer 61 will be the radiation free from all ethane and all propane absorbable frequencies and impinging against the bolometer 63 will be a beam of radiation free from ethane frequencies but only partially free from propane frequencies. Thus, the amounts of the radiation impinging against the bolometers 61 and 63 are unequal and this inequality of radiation will be indicated in the recording apparatus 67 by one of the traces 71.

For determination of the percentage of ethane in the gaseous sample the motor 47 operates under the influence of the time clock switch 50 to rotate the gears 45, 23 and cylinder 21 through a 90 degree angle. This amount of rotation will place an opposite pair of cell systems in the beams of radiation. In this case, as illustrated in Figure 1, cells 26 and 28 will replace cells 25 and 27 while cells 30 and 32 will replace cells 29 and 31. The cells 26 and 28 will be filled with propane and with ethane as were cells 25 and 27 for complete blacking out as regards ethane and propane. Cell 30 corresponds in position to cell 29 as illustrated in Figure 1. This cell 30 will be filled with propane. The cell 32 which replaces 31 of Figure 1 will be filled with air. In this arrangement of cells, the cell 30 which is filled with propane will absorb the radiation frequencies or wave lengths characteristic of propane while all these frequencies or wave lengths of radiation characteristic of ethane will pass through the cell 32 and will contact the bolometer 63. The amount of radiation frequency or wave length characteristic of ethane which actually passes as beam 40 will be dependent upon the amount of ethane in the sample of gas in the sample cell 33. The greater the concentration of ethane in the gas in the sample cell 33, the less will be the radiation intensity impinging against the bolometer 63. Thus, with cells 26 and 28 filled with ethane and propane, respectively, and cell 32 filled with air, and cell 30 filled with propane, the frequencies or intensity of radiation impinging against the bolometers 61 and 63 will be unlike and these unlike effects will be balanced in the potentiometer recorder apparatus 67 and indicated as percentage of ethane by one of the traces 71.

In place of the cells 25, 27, and 26, 28, filters may be used for absorbing characteristic frequencies absorbed by ethane and propane. Any mechanical arrangement of filters which will filter or absorb the proper frequencies or wave lengths of radiation may be used in place of the several cells. When an apparatus is set up as illustrated in Figure 1 for the direct determination of the propane content, the cell 31 which, as shown in the drawing, is filled with ethane may also be replaced by a mechanical filter adapted to the absorption of the wave length of radiation characteristically absorbed by ethane.

When using a plurality of cells containing windows transparent to the desired radiation wave lengths or frequencies, these cell windows should be as nearly completely transparent as possible to the radiation so that sufficient amounts of radiation can be transferred to the bolometers 61 and 63 or provide sufficient effect upon these instrument sections for proper operation of the potentiometer-recorder device 67.

If any frequency or wave length of radiation characteristically absorbed by ethane overlaps any frequencies or wave lengths characteristically absorbed by propane then the ethane-filled cells 25 and 31 should be used rather than mechanical filters. However, under conditions that wave lengths or frequencies absorbed by ethane do not overlap any of these frequencies or wave lengths absorbed by propane, then the cells 25 and 31 containing ethane may, if desired, be omitted from the apparatus or filled with air. The difference in intensity of the radiation impinging against bolometers 61 and 63 will then be characteristic of the concentration of propane in the sample cell 33. Under this condition the intensity of radiation impinging against bolometer 61 will be less than the intensity of radiation impinging against bolometer 63. All of the frequencies or wave lengths of radiation characteristic of propane are absorbed by the propane in cell 27 from beam 38. The amount of absorption of the frequencies or wave lengths characteristic of propane removed from beam 40 is that absorbed by the propane in the sample cell 33. The difference in the energies impinging against bolometers 61 and 63 will then be indicated by one of the traces 71 on the chart in the recording instrument 67 as percentage of propane in the sample. The apparatus as illustrated in Figure 1 and Figure 2 may be used for intermittent or periodic analysis of samples of a two-component gas. Gas may be passed into the sample cell 33 and determination of the ethane and the propane contents made. Or a continuous stream of a two-component gas may be passed through sample cell 33 and the ethane and propane contents of this gas stream determined at certain time intervals and recorded as traces 71 on the chart in the recorder 77.

In the apparatus as illustrated in Figure 3, a four-component gas may be analyzed for concentration of each of the four components. This apparatus may be constructed in the following manner: Behind a wheel 81 is a cylinder similar to the cylinder 21 in Figure 1, while behind wheel 79 is also a similar cylinder. In the cylinder behind wheel 81 is provided four sample cells similar to cells 25, 26, etc., each cell of which is charged with a component of the gas undergoing analysis. Behind each of the openings 83A, 85A, 87A, and 89A is provided a series of four cells and one of each is filled with one of the four components. For example, the gas undergoing analysis according to the apparatus in Figure 3 may consist of the components methane, ethane, propane, and butane. Thus, the four cells behind each of the openings 83A, 85A, 87A, and 89A will contain cells filled with each of these four components. Behind each of the openings 83, 85, 87, and 89 in wheel 79 are also placed four cells. For convenience and ease of construction, I prefer to arrange the radiation source and the two reflectors so that the two beams being reflected toward the bolometers will pass through closely adjacent openings. For example, the reflectors are so arranged that one beam of radiation will pass through opening 83 in wheel 79 and the other beams will pass through the openings 83A in wheel 81. Upon rotation of these two wheels, the two openings 85 and 85A will next be disposed in the line of the radiation beams. Upon further rotation of the wheel openings 87 and 87A and finally openings 89 and 89A will be in the proper position for the determination. If the cells behind opening 83 are intended to be arranged for the determination of the methane content of a gas sample, cells behind this opening 83 will be filled with ethane, propane, and butane, and the fourth cell may be filled with air. Cells filled with these three hydrocarbon components will absorb the frequencies or wave lengths of radiation characteristic of these three hydrocarbons, while the frequencies or wave lengths of radiation characteristic of methane will pass through them and be impinged against one of the bolometers of the detector device. Since the four cells behind the opening 83A of the wheel 81 are filled with all four of the components, then there will be an unbalanced condition of the two bolometers of the Wheatstone bridge circuit and this unbalanced condition will be indicated by one of the traces 105 of the recording apparatus 99. If the arrangement of the cells behind opening 85 in wheel 79 is intended to determine the ethane content of a given sample, three of the cells positioned behind this opening will contain methane, propane, and butane, and the fourth cell may contain air. This arrangement of cells will not absorb rays characteristic of ethane. In like manner, the cell arrangements behind the openings 87 and 89 are exactly like those of 83 and 85 excepting one cell behind opening 87 will not contain propane and one cell behind opening 89 will not contain butane. Thus, upon the complete revolution of wheel 79 a complete analysis of the four-component gas containing methane, ethane, propane, and butane will be made and indicated by the four traces 105 on the recording instrument 99. The wheels 79 and 81 mounting the filter cells are rotated by a motor 91 which receives electrical energy through lead wires 93 and wires 96 and this energy is controlled by a time clock controller switch 94. The switch apparatus 94 is similar to the timer apparatus 50 of Figure 1 and provides such a type of operation that the wheels 79 and 81 will be so rotated that corresponding pairs of cells will be in line of the radiation beams for a certain period of time sufficient for the heat effect to become apparent on the bolometer so that the traces indicated on the chart of the recording apparatus would be accurate determination of the gas undergoing analysis. When sufficient time has elapsed or after determination of the one component, the timer apparatus then operates to permit rotation of the wheels 79 and 81 so that a second pair of openings will come to rest in the beams of radiation. Electrical energy for operating the recording apparatus 99 is furnished from a source, not shown, through wires 103. The three wires 101 in Figure 3 are similar to the three wires 65 of Figure 1 and lead from the recording apparatus 99 to the three terminals of the two Wheatstone bridge arms. The four wires 97 lead from four terminals on the recording apparatus 99 to the four points on the selector switch 95. Energy for producing four traces 105 is furnished by the output across the Wheatstone bridge circuit containing the detectors 61 and 63. Current from the battery passes through a shaft from the motor 91 to the selector switch 95 and thence through the wires identified by numeral 97 into the recording apparatus 99. The shaft from the motor 91 to selector switch 95 is identified by reference numeral 107.

Apparatus of Figure 4 is especially adapted to the analysis of a four-component gaseous system in which one of the components is methane. The general make-up of apparatus as illustrated in Figure 4 is similar to that of Figures 1, 2, and 3. The main difference is that the cell which is intended to contain methane since methane gas is not very absorptive to infrared radiation. In other words, for a given absorption of a characteristic wave length or frequency, the cell which contains the methane gas should be longer so that the beam of radiation can pass through the longer column of gas. Ethane, propane, and butane hydrocarbons are considerably more absorptive for radiation than is methane, and, accordingly, cells adapted to contain these hydrocarbons may be made considerably shorter than the cell for the methane.

In like manner, if a gas to be analyzed contains methane, the sample cell should be made relatively long in a manner similar to the control cells. Thus, in Figure 4, sample cells 145A and 145B are relatively long and these cells are used for the sample undergoing analysis when the sample is being analyzed for its methane content. The sample cells 147A and 147B may be used for the gas undergoing analysis in case the gas is being analyzed for its ethane, propane, or butane content. The cell used for the determination of one or more of the latter mentioned hydrocarbons is shorter than the methane cells 145A and 145B for the same reason that the cells for containing the $C_2$, $C_3$, and $C_4$ hydrocarbons are shorter. A longer sample cell must be used if the amount of the material being analyzed is small; if the material is butane a cell two times as long would have to be used for a mixture of 50% butane and 50% air as a sample of 100% butane to get the same deflection on the recorder.

In the apparatus embodiment of Figure 4, gear wheels 113 and 115 are provided with apparatus parts for supporting such gas cells as 141A, 141B, 141C, 141D, etc. The sample cells 147A and 147B and 145A and 145B may be disposed between these aforementioned cells and the bolometers 155 and 157, as illustrated in the embodiment of Figure 4. In this figure, the source of radiation 159 provides infrared or other radiation, a portion of which is reflected by a reflector 161 to form the beam of radiation 162. Another portion of radiation from source 159 is reflected by reflector 163 and forms the beam of radiation 164. The intensity of these two beams may be adjusted by the trimmers 165 and 167. These trimmers may be shutter-type trimmers or bolt-type trimmers as mentioned in connection with Figure 1.

Driving the gear wheel 115 is a gear 117 which is rotated by a shaft 119 and is an extension of the shaft from the motor 121. This motor 121 may be an electric motor operated by electricity from a source, not shown, through wires 124 and 122. Element 123 is a timer switch similar to the timer switch 94 of Figure 3 and 50 of Figure 1. Hence, the apparatus of Figures 4 and 5 is intended to be used in the analysis of a four-component gas mixture; and the recording apparatus 135 is so constructed as to produce four traces 137, each of which is characteristic of the one component of the gas mixture undergoing analysis. A battery 125 grounded at 127 furnishes current through shaft 119 for passage through the selector switch 129 and wires 131 to assist in operation of the recorder 135 in a well known manner. The battery circuit from the battery 125 is grounded at 139 from the recorder 135. Lead wires 133 connect the several terminals of the bolometers 155 and 157 as shown with the recorder 135.

As mentioned above, the sample cells 145A and 145B are for containing the gas undergoing analysis when the determination of methane is to be made, and the sample cells 147A and 147B are for containing gas undergoing analysis when the gas is being analyzed for its ethane, propane, or butane content. The longer cells 145A and 145B are used as mentioned above for the methane analysis since methane does not absorb radiation as readily as do the other hydrocarbon gases; and in order to get a sufficient degree of absorption of radiation to make an appreciable differential effect on the bolometers 155 and 157, a longer column of gas must be furnished. A double three-way valve 149 is provided to control the flow of gas or air to the pairs of sample cells. Gas undergoing analysis is supplied through line 153 to the three-way valve from a source, not shown. Air is provided to the three-way valve from line 151. When the gas undergoing analysis is to be analyzed for its methane content, it is preferable to fill, for example, both sample cells 145A and 147A and 145B and 147B with the gas. In this case, cell 142A may be filled with air, while cell 142B, 142C, and 142D are filled respectively with propane, butane, and ethane. As a control to this system, the several cells 144A, 144B, 144C, and 144D are filled respectively with methane, propane, butane, and ethane. Thus, these latter cell systems referred to broadly as cells 142 and 144 are exactly alike with the exception that the longer of the several cells in the case of the 142 cells is filled with air while the longer of the 144 cells is filled with methane. The beam of radiation 162 differs in intensity from the beam of radiation 164 by the amount of methane gas in the sample in sample cell 145A and 147A. This difference in radiation intensity is indicated in the recording apparatus by one of the traces 137.

When propane gas is being analyzed for, it need not be supplied in the sample cells in as long a column as was used when a gas was being analyzed for methane since a given length of column of propane is much more absorptive to radiation than is a column of methane. Thus, when the gas is being analyzed for its propane content, only cells 147A and 147B need be filled with the gas undergoing analysis and the sample cells 145A and 145B may be filled with air. This air is supplied to the cells 145A and 145B by proper operation of the double three-way valve 149. This double three-way valve 149 is rotated by an extension of shaft 119 which in turn is operated by the motor 121. When propane is the gas being determined, the several absorption cells, as the cell series 141, are filled with gases as follows: cell 141A, methane; cell 141B with air; cell 141C with butane; and cell 141D with ethane. Since the cell system referred to broadly as cell 143 is used at the same time the cell system referred to broadly as cell 141 is used, the cell system 143 is composed of the following components: cell 143A is filled with methane; cell 143B with propane; cell 143C with butane; and cell 143D with ethane. Thus, with cell systems 143 and 141 in the beams of radiation 164 and 162, the differences in the radiation absorption by these cells as detected by the bolometers 157 and 155 is indicated in the recording apparatus by another one of the traces 137. In like manner, additional cell systems in the wheels 113 and 115 are provided with the sample cells for the analysis of the gas for its ethane and for its butane contents in a manner similar to that just described for the methane and propane contents. Since ethane and butane absorb these radiations to a greater extent than does the methane, the large or long sample cells 145A and 145B need not be filled with gas undergoing anaylsis. When the motor 121 as controlled by the timer clock switch 123 has so operated as to give a complete revolution of the gear wheels 113 and 115, four points will be indicated on the traces 137 in the recorder 135. These four points will be an indication of the percentage composition of the gas undergoing analysis when the recording chart is so standardized.

Double 3-way valves are known in the art and, hence, will not be described in detail. The use of the 3-way valve 149 in conjunction with the short sample cells 147A and 147B and the long sample cells 145A and 145B makes it possible to be able to utilize three different lengths of sample cells in the analyzer.

Figure 10 is intended to illustrate an embodiment of my invention wherein a 6-component gas is analyzed for each of its six components. The center circle in the figure is intended to be the cell system containing cells which contain each of the gases present in the 6-component gas undergoing analysis. For example, if the gas undergoing analysis normally contains methane, ethane, propane, butane, pentane, and some hexane then the cell system behind this central opening should be composed of six cells, each one of which is filled with one of the components just mentioned. Behind the opening 205A is a cell system composed of six cells. Each of these six cells is filled with a gas. Five of the cells are filled with five of the components of the gas undergoing analysis, while the sixth cell is filled with air. Gas which is not included in the cell system 205A is the gas being analyzed for when this cell system 205A is in the beam. The cells behind the central opening 208 rotate as does the wheel 199, but this system 208 rotates around its own axis as a center and does not at any time become removed from the beam of radiation. In other words, the cell system 208 always is in a beam of radiation while one of the cell systems, as indicated by, for example, 205A or 205C, etc., is intended to be in the other beam of radiation. The motor 201 is intended to rotate the wheel 199. The motor 203 is provided with a driving gear 201 which meshes with the driven gear 199. This motor 203 may be an electrical motor operated by electricity from wires 204 originating at a source not shown. The operation of this motor 203 is controlled by the timer switch apparatus 202.

When an apparatus for the analysis of the 6-component stream is constructed as indicated by Figure 10, the apparatus is relatively compact, simple, and easy to operate.

Still another embodiment of my apparatus is indicated by Figures 11 and 12 of the drawing. In this particular embodiment the cell system 213 is the cell system which contains a cell containing each of four components of the gas stream being analyzed. The four cell systems 211A, 211B, 211C, and 211D are for containing the filter cells with one cell of each of these cell systems being filled with air. A plan view of the apparatus of Figure 11 and partly in section is indicated in Figure 12. In this embodiment it is seen that reflectors 219A and 219B form beams of radiation passing through the cell 213 and one of the cells of the large wheel 209. Trimmers 221A and 221B are provided for controlling the intensity of the beams of radiation. These trimmers may be similar to those of Figure 4.

The embodiment of apparatus as illustrated by Figures 11 and 12 is adapted for the analysis of 4-component samples. It will be obvious that more than four cell systems may be provided around the circle which centers at the center of wheel 209. Thus, there may be provided space for installation of six, eight, or even a larger number of cell systems. Such an embodiment as illustrated by Figures 11 and 12 may be used for analyzing a gas stream containing most any reasonable number of components. This wheel 209 may be rotated by a gear 215 which in turn is powered by a motor 217. This motor may be operated by electric current supplied through wires 218 from a source, not shown. This motor 217 may be turned off and on as desired by the timer switch apparatus 216. The operation of this timer switch is similar to that described in Figure 4.

The apparatus embodiments illustrated in Figures 6, 7, 8, and 9, are in general, the same as embodiments hereinbefore described. There is, however, one main point of distinction. This point is that the U-tube of Figures 6 and 8 contains the source of radiation 181 and 185, respectively. In this apparatus in Figures 6 and 7, the U-tube 169 is a tube in which the interior walls are highly polished so as to form the reflecting surfaces for the radiation from source 181. Thus, when 181 furnishes radiation, the walls of the U-tube 169 reflect the radiation from the tube in a direction towards the bolometers 175A and 175B. The filter cells 179A and 179C are similar to those filter cells of Figure 1. Trimmers 171A and 171B are contained in the filter cells of Figure 6 and similarly trimmers may be inserted in the filter cells 27 and 29 of Figure 1 instead of the trimmers 41 and 43 adjacent the reflectors 37 and 39. Trimmers similar to trimmers 221A and 221B of Figure 12 may alternately be positioned in the filter cells 211A, 211B, 211C, and 211D of Figures 11 and 12. Figure 7 is an end view of the apparatus of Figure 6 and it indicates that this particular apparatus is for the analysis of a 2-component system similar to the apparatus of Figures 1 and 2. Four cell systems, 179A, 179B, 179C, and 179D, are provided. In this system, cell systems 179A, 179B, 179C, and 179D are the filter cells for removing characteristic wave lengths or frequencies of radiation from the beams. The cell system 179C and 179D are the cell systems in which the component being analyzed for is not supplied in one of the cells. This arrangement of cell systems is fully explained in the embodiment hereinbefore described. The sample undergoing analysis is supplied to the beams of radiation in cells 173A, 173B. Wires 177 connect the several terminals of bolometers 175A and 175B to such a recording apparatus as illustrated in Figure 1. Elements 174A and 174B are polished funnel-type tubes for concentrating the radiation in the detectors 175A and 175B. The walls of the filter cells and sample cells in the embodiments of Figures 6, 7, 8 and 9 should be highly polished as well as the walls 169 and 183.

In Figures 8 and 9 is illustrated an apparatus which is adaptable for analyzing a 4-component stream. This apparatus of Figure 8 as far as the cylinders 187A and 187B are concerned is exactly like the embodiments shown in Figures 4 and 5. The filter cells of the cylinders 187A may be exactly like those supported by element 113, and the filter cells arranged in cylinder 187B are similar to those illustrated with element 115 of Figures 4 and 5.

This apparatus of Figure 8 contains a source of radiation 185 within a polished tube 183 similar to that arrangement of Figure 6. Radiation passes from left to right in the tube system in the direction of the bolometers 193A and 193B. Sample cells 197A and 197B are provided for the gas undergoing analysis. Wires 195 connect the several terminals of the bolometers 193A and 193B to such a recording apparatus as illustrated in the embodiments described hereinbefore. Elements 194A and 194B are also polished funnel-type tubes for concentrating the radiation on the detectors 193A and 193B.

As indicated above, the basic concept of my invention may be modified in many ways. Thus, in the application of this invention the source of radiation used may provide X-ray, visible light, ultraviolet light, infrared light, or even radio waves. It is further apparent that any suitable means may be used for detecting the unbalance of the bolometers 51 and 53 as illustrated in Figure 1.

The apparatus of this invention may be used for the analysis of liquid hydrocarbon streams as well as for gas hydrocarbon streams. The main difference in the apparatus as used for the analysis of liquid hydrocarbon streams is that the several filter cells may need not be as long as when gases are being analyzed.

While the invention has been described in connection with preferred embodiments thereof, it is to be understood that this description is illustrative only and is not intended to limit the invention, the scope of which is defined by the appended claims.

I claim:

1. In a photometric analyzer, in combination, a radiation source, a radiation detector, means to form a pair of radiation beams extending from said source to said detector, a first cell disposed in the first of said beams, a plurality of second cells adapted to be disposed selectively in the second of said beams, said first and second cells being adapted to hold fluid substances preferentially absorbing certain wave lengths of said radiation beams, a motor for moving said second cells into and out of said second beam, a selector switch driven by said motor, a timer switch in the motor circuit for deenergizing said motor each time one of said second cells is in position to permit passage therethrough of said second radiation beam, and a fixed cell disposed in both beams of radiation, said fixed cell being adapted to contain a sample to be analyzed.

2. In a photometric analyzer, in combination, a radiation source, a radiation detector, reflecting means to form a pair of radiation beams extending from said source to said detector, a rotatable cylinder having a plurality of perforations in each end, the end perforations being so aligned as to allow passage of said pair of radiation beams at certain degrees of rotation of said cylinder, a plurality of cells disposed in said rotatable cylinder and in axial alignment with a pair of perforations one each of which is in opposite ends of said cylinder, said cells being adapted to hold a fluid substance preferentially absorbing certain wave lengths of said radiation beams, a motor for rotating said cylinder, a selector switch driven by said motor, a timer switch in the motor circuit for deenergizing said motor each time a pair of corresponding perforations and the cells therebetween are in position to permit passage therethrough of said radiation beams, and a nonrotatable cell disposed in both beams of radiation, said nonrotatable cell being adapted to contain a fluid sample to be analyzed.

3. In a photometric analyzer, in combination, a radiation source, a radiation detector, a pair of reflectors to form a pair of radiation beams extending from said source to said detector, a rotatable cylinder having a plurality of perforations in each end, the centers of the perforations in each end of the cylinder being spaced around a circle concentric with the center of rotation of the rotatable cylinder, each perforation in one end of said cylinder being so aligned with a perforation in the other end that the pair of beams of radiation may pass from said reflectors to said detector at certain degrees of rotation of said cylinder, a plurality of cells disposed in said cylinder and in axial alignment with pairs of corresponding perforations, said cells being adapted to hold a fluid substance preferentially absorbing certain wave lengths of said radiation beams, a motor for rotating said cylinder, a selector switch driven by said motor, a timer switch in the motor circuit for deenergizing said motor each time a pair of corresponding perforations and the cells therebetween are in position to permit passage of a radiation beam and to energize said motor after expiration of a period of time during which said motor is deenergized for rotation of said cylinder to a second point at which said beams of radiation traverse a pair of corresponding perforations and cells to said detector, and a non-rotatable cell disposed in both beams of radiation, said nonrotatable cell being adapted to contain a fluid sample to be analyzed.

4. The apparatus of claim 3 wherein said rotatable cylinder contains four perforations in one end corresponding to four perforations in the other end, and each pair of corresponding perforations is provided with said cells.

5. The apparatus of claim 4 wherein said rotatable cylinder contains an additional perforation in each end positioned at the center of rotation, filter cells disposed in optical alignment between said additional perforations, and one reflector of said pair of reflectors disposed to direct one of said beams of radiation along a path coinciding with the center of rotation of said cylinder.

6. In a photometric analyzer, in combination, a radiation source, a radiation detector, a pair of reflectors to form a pair of radiation beams extending from said source to said detector, a pair of oppositely rotatable cylinders having a plurality of perforations in each end of each cylinder, the centers of the perforations in the cylinder ends being spaced around a circle concentric with the center of rotation of the cylinders, each perforation in one end of each of said cylinders being so aligned with a perforation in the other end of that cylinder that one of said radiation beams may pass through a pair of perforations from one reflector to said detector at a certain degree of rotation of that cylinder and the other of said radiation beams may pass through a corresponding pair of perforations from the other reflector to said detector at a second certain degree of rotation of the second cylinder, a plurality of cells disposed in said cylinders and in axial alignment with pairs of corresponding perforations, said cells being adapted to hold a substance preferentially absorbing certain wave lengths of said radiation beams, a motor for rotating said cylinders, a selector switch driven by said motor, a timer switch in the motor circuit for deenergizing said motor each time two pairs of perforations are in position to pass the radiation beams and to energize said motor after expiration of a period of time during which said motor is deenergized for rotation of said cylinders to a second point at which said beams of radiation traverse another two pairs of perforations and cells and a nonrotatable cell disposed in both beams of radiation, said nonrotatable cell being adapted to contain a sample to be analyzed.

7. In a photometric analyzer, in combination, a radiation source, a radiation detector, reflecting means to form a pair of radiation beams extending from said source to said detector, a pair of cells disposed in each beam, said cells being adapted to hold a fluid substance preferentially absorbing certain wave lengths of said radiation beams, a motor for moving said cells into and out of said beams, a selector switch driven by said motor, a timer switch in the motor circuit for deenergizing said motor each time a pair of corresponding cells are in position to permit passage therethrough of said radiation beams, and a fixed cell disposed in both beams of radiation, said fixed cell being adapted to contain a fluid sample to be analyzed.

8. The photometric analyzer of claim 7, wherein a trimmer is disposed in one cell of each pair of cells.

9. In a photometric analyzer, in combination, a radiation source, a radiation detector, reflecting means to form a pair of radiation beams extending from said source to said detector, a plurality of cells disposed in each beam, said cells being adapted to hold a fluid substance preferentially absorbing certain wave lengths of said radiation beams, a motor for moving said cells into and out of said beams, a selector switch driven by said motor, a timer switch in the motor circuit for deenergizing said motor each time a pair of corresponding cells are in position to permit passage therethrough of said radiation beams, and a fixed cell disposed in both beams of radiation, said fixed cell being adapted to contain a sample to be analyzed and comprising a pair of cells of unequal length axially in alignment with said beams of radiation, a first conduit means for admitting a gas to the longer of the fixed cells, a conduit means for exhaust of gas from said longer cell, a second conduit means for admitting a gas to the shorter of the fixed cells, a conduit means for exhausting gas from the shorter of said cells, a 3-way valve in operative communication with said first and second conduit means for admission of a first gas to one of the fixed cells, for admission of a second gas to the second of the fixed cells, and for admission of the first gas to both of the fixed cells, a supply of said first gas, a supply of said second gas and a conduit means from the supplies of gases to said 3-way valve.

References Cited in the file of this patent

UNITED STATES PATENTS

| | | |
|---|---|---|
| 2,152,645 | Holven et al. | Apr. 4, 1939 |
| 2,355,092 | Meister | Aug. 8, 1944 |
| 2,386,878 | Nickerson | Oct. 16, 1945 |
| 2,496,333 | Cary et al. | Feb. 7, 1950 |
| 2,534,657 | Bray | Dec. 19, 1950 |
| 2,555,327 | Elliott | June 5, 1951 |